US008731815B2

(12) United States Patent
Cummings

(10) Patent No.: US 8,731,815 B2
(45) Date of Patent: May 20, 2014

(54) HOLISTIC CYBERNETIC VEHICLE CONTROL

(76) Inventor: Charles Arnold Cummings, Cincinnati, OH (US)

( * ) Notice: Subject to any disclaimer, the term of this patent is extended or adjusted under 35 U.S.C. 154(b) by 1014 days.

(21) Appl. No.: 12/291,635

(22) Filed: Sep. 18, 2009

(65) Prior Publication Data

US 2011/0071761 A1 Mar. 24, 2011

(51) Int. Cl.
*G06F 17/10* (2006.01)
*G06G 7/78* (2006.01)

(52) U.S. Cl.
USPC ............ 701/301; 342/71; 342/59; 340/435; 340/903; 701/532

(58) Field of Classification Search
USPC ............ 701/24–25, 301, 532; 700/255, 258; 340/436, 945, 961, 933, 936, 435, 903; 318/567; 342/350, 451, 29–30, 59, 71
See application file for complete search history.

(56) References Cited

U.S. PATENT DOCUMENTS

| | | | |
|---|---|---|---|
| 2,933,726 A * | 4/1960 | Campbell et al. ............ 342/451 |
| 4,073,359 A * | 2/1978 | Fujiki et al. .................. 180/169 |
| 4,240,152 A * | 12/1980 | Duncan et al. ............... 367/108 |
| 4,626,850 A | 12/1986 | Chey |
| 4,706,195 A * | 11/1987 | Yoshino et al. ............... 701/96 |
| 4,734,675 A | 3/1988 | Wen |
| 4,833,469 A * | 5/1989 | David ........................... 340/901 |
| 4,835,537 A * | 5/1989 | Manion ......................... 342/30 |
| 5,249,157 A | 9/1993 | Taylor |
| 5,369,591 A | 11/1994 | Broxmeyer |
| 5,467,072 A | 11/1995 | Michael |
| 5,515,026 A | 5/1996 | Ewert |
| 5,519,410 A | 5/1996 | Smalanskas et al. |
| 5,541,590 A | 7/1996 | Nishio |
| 5,548,516 A * | 8/1996 | Gudat et al. ................... 701/23 |
| 5,594,414 A | 1/1997 | Namngani |
| 5,610,815 A * | 3/1997 | Gudat et al. ................... 701/23 |
| 5,612,883 A | 3/1997 | Shaffer et al. |
| 5,615,116 A * | 3/1997 | Gudat et al. ................... 701/23 |
| 5,638,281 A | 6/1997 | Wang |
| 5,646,613 A | 7/1997 | Cho |
| 5,680,313 A | 10/1997 | Whittaker et al. |
| 5,684,701 A | 11/1997 | Breed |
| 5,689,442 A | 11/1997 | Swanson et al. |

(Continued)

OTHER PUBLICATIONS

Vehicle detection using an extended Hidden Random Field model; Xuetao Zhang; Nanning Zheng; Yongjian He; Fei Wang Intelligent Transportation Systems (ITSC), 2011 14th International IEEE Conference on; Digital Object Identifier: 10.1109/ITSC.2011.6083135; Publication Year: 2011 , pp. 1555-1559.*

(Continued)

*Primary Examiner* — Cuong H Nguyen
(74) *Attorney, Agent, or Firm* — John B. Woodard; Jon L. Woodard

(57) ABSTRACT

Holistic cybernetic vehicle control enables the results of machine sensing and decision making to be communicated to a vehicle operator through the various senses of the operator. By providing machine advice to the operator through various vehicle functions and by integrating the machine advice with what the operator senses and perceives, holistic cybernetic control can result in much better and safer vehicle operation. The invention integrates human and machine vehicle control action to improve vehicle operation and, particularly, to avoid collision events.

16 Claims, 13 Drawing Sheets

(56) References Cited

U.S. PATENT DOCUMENTS

| | | | |
|---|---|---|---|
| 5,734,336 A | 3/1998 | Smithline | |
| 5,959,552 A | 9/1999 | Cho | |
| 5,978,737 A | 11/1999 | Pawlowski et al. | |
| 5,979,586 A | 11/1999 | Farmer et al. | |
| RE36,470 E | 12/1999 | Woll et al. | |
| 6,025,775 A | 2/2000 | Erlandson | |
| 6,028,548 A | 2/2000 | Farmer | |
| 6,085,151 A | 7/2000 | Farmer et al. | |
| 6,158,556 A | 12/2000 | Swierczewski | |
| 6,185,504 B1 | 2/2001 | Berstis et al. | |
| 6,236,936 B1 | 5/2001 | Berstis et al. | |
| 6,281,808 B1* | 8/2001 | Glier et al. | 340/933 |
| 6,317,691 B1 | 11/2001 | Narayan et al. | |
| 6,370,475 B1 | 4/2002 | Breed et al. | |
| 6,405,132 B1 | 6/2002 | Breed et al. | |
| 6,442,465 B2 | 8/2002 | Breed et al. | |
| 6,442,473 B1 | 8/2002 | Berstis et al. | |
| 6,487,500 B2* | 11/2002 | Lemelson et al. | 701/301 |
| 6,507,779 B2 | 1/2003 | Breed et al. | |
| 6,559,763 B2* | 5/2003 | Murphy et al. | 340/436 |
| 6,609,053 B1 | 8/2003 | Breed | |
| 6,633,238 B2 | 10/2003 | Lemelson et al. | |
| 6,665,631 B2 | 12/2003 | Steinbrecher | |
| 6,675,095 B1* | 1/2004 | Bird et al. | 701/301 |
| 6,703,944 B1 | 3/2004 | Obradovich | |
| 6,711,280 B2 | 3/2004 | Stafsudd et al. | |
| 6,765,495 B1 | 7/2004 | Dunning et al. | |
| 6,812,884 B2 | 11/2004 | Richley et al. | |
| 6,864,831 B2 | 3/2005 | Woodington et al. | |
| 6,873,250 B2 | 3/2005 | Viana | |
| 6,954,177 B2 | 10/2005 | Channabasappa et al. | |
| RE38,870 E* | 11/2005 | Hall | 701/301 |
| 6,975,932 B2 | 12/2005 | Obradovich | |
| 6,988,026 B2 | 1/2006 | Breed et al. | |
| 7,014,003 B2 | 3/2006 | Polak | |
| 7,038,577 B2* | 5/2006 | Pawlicki et al. | 340/435 |
| 7,046,128 B2 | 5/2006 | Roberts | |
| 7,049,945 B2 | 5/2006 | Breed et al. | |
| 7,075,458 B2 | 7/2006 | Dowdy | |
| 7,076,366 B2 | 7/2006 | Simon et al. | |
| 7,079,024 B2 | 7/2006 | Alarcon | |
| 7,102,496 B1 | 9/2006 | Ernst, Jr. et al. | |
| 7,124,027 B1 | 10/2006 | Ernst, Jr. et al. | |
| 7,130,745 B2 | 10/2006 | Sherony | |
| 7,148,791 B2 | 12/2006 | Grisham et al. | |
| 7,188,012 B2 | 3/2007 | Salmeen et al. | |
| 7,190,260 B2 | 3/2007 | Rast | |
| 7,202,776 B2 | 4/2007 | Breed | |
| 7,209,050 B2 | 4/2007 | Corcoran, III | |
| 7,209,221 B2 | 4/2007 | Breed et al. | |
| 7,209,831 B2 | 4/2007 | Hilliard | |
| 7,263,209 B2 | 8/2007 | Camus et al. | |
| 7,284,769 B2 | 10/2007 | Breed | |
| 7,295,925 B2 | 11/2007 | Breed et al. | |
| 7,330,103 B2 | 2/2008 | Boss et al. | |
| 7,359,782 B2 | 4/2008 | Breed | |
| 7,365,769 B1 | 4/2008 | Mager | |
| 7,369,598 B2 | 5/2008 | Fontana et al. | |
| 7,375,627 B2 | 5/2008 | Johnson et al. | |
| 7,397,351 B1 | 7/2008 | Rubin et al. | |
| 7,400,290 B2 | 7/2008 | Woodington et al. | |
| 7,403,659 B2 | 7/2008 | Das et al. | |
| 7,409,092 B2 | 8/2008 | Srinivasa | |
| 7,409,295 B2 | 8/2008 | Paradie | |
| 7,415,126 B2 | 8/2008 | Breed et al. | |
| 7,415,321 B2 | 8/2008 | Okazaki et al. | |
| 8,224,551 B2* | 7/2012 | Grolle et al. | 701/96 |
| 2003/0014176 A1* | 1/2003 | Levine | 701/70 |
| 2004/0260470 A1* | 12/2004 | Rast | 701/300 |
| 2007/0021915 A1* | 1/2007 | Breed et al. | 701/301 |
| 2007/0152804 A1* | 7/2007 | Breed et al. | 340/435 |
| 2007/0255480 A1* | 11/2007 | Southall et al. | 701/96 |
| 2008/0040023 A1* | 2/2008 | Breed et al. | 701/117 |
| 2008/0133136 A1* | 6/2008 | Breed et al. | 701/301 |
| 2011/0071761 A1* | 3/2011 | Cummings | 701/301 |

OTHER PUBLICATIONS

A New Paradigm for Intelligent Collision Avoidance via Interactive and Interdependent Generic Maneuvers; Ranatunga, R.; Kumarawadu, S.; Lingras, P.; Tsu-Tian Lee; Systems, Man and Cybernetics, 2006. SMC '06. IEEE International Conference on vol. 6;Digital Object Id: 10.1109/ICSMC.2006.385033; Pub. Year: 2006 , pp. 4625-4630.*

Vehicle collision avoidance system [VCAS]; Wong, C.Y.; Qidwai, U.; Sensors, 2004. Proceedings of IEEE Digital Object Identifier: 10.1109/ICSENS.2004.1426165; Publication Year: 2004 , pp. 316-319 vol. 1.*

Obstacles detection and collision avoidance system developed with virtual models; Sosa, R.; Velazquez, G.; Vehicular Electronics and Safety, 2007. ICVES. IEEE International Conference on; Digital Object Identifier: 10.1109/ICVES.2007.4456397 Publication Year: 2007 , pp. 1-8.*

A sideways-looking radar signal processing; Aly, O.A. ; Omar, A.S.; Antennas and Propagation Society International Symposium, 2002. IEEE; vol. 3; Digital Object Identifier: 10.1109/APS.2002.1018232; Publication Year: 2002 , pp. 376-379 vol. 3.*

A sensor based assessment of imminent collisions at right angle intersections; Streib, K. ; Ozguner, U. ; Martin, J. ; Mochizuki, Y. ; Ishikawa, K.; Vehicular Electronics and Safety, 2008. ICVES 2008. IEEE International Conference on; Digital Object Identifier: 10.1109/ICVES.2008.4640885; Publication Year: 2008 , pp. 210-215.*

Traffic monitoring and modeling for Intersection Safety; Pyykonen, P. ; Molinier, M. ; Klunder, G.A.; Intelligent Computer Communication and Processing (ICCP), 2010 IEEE International Conference on; Digital Object Identifier: 10.1109/ICCP.2010.5606407; Publication Year: 2010 , pp. 401-408.*

Development of a VII-enabled prototype intersection collision warning system;Nekoui, M. et al., Testbeds and Research Infrastructures for the Development of Networks & Communities and Workshops, 2009. TridentCom 2009. 5th Inter. Conf on Dig Obj Id10.1109/TRIDENTCOM.2009.4976251; Pub Year: 2009 , pp. 1-8.*

* cited by examiner

Table Showing Relative Distance and Closing Velocity Between Vehicles A-B

$D_c$ = Distance Between Vehicle A-B     $V_c$ = Max. Closing Velocity Allowed     $V_b$ = Velocity of Vehicle B

| | $V_b$ < 5 yds/sec (10 mph) | $V_b$ < 5 to 20 yds/sec (10- 40 mph) | $V_b$ < 20 to 30 yds/sec (40- 60 mph) | $V_b$ < 30 to 45 yds/sec (60- 90 mph) |
|---|---|---|---|---|
| If $D_c$ = Then $V_c$ = | 400 yds 45 yds/sec (90 mph) | 400 yds 40 yds/sec | 400 yds 30 yds/sec | 400 yds 20 yds/sec |
| If $D_c$ = Then $V_c$ = | 200 yds 35 yds/sec (65 mph) | 200 yds 30 yds/sec | 200 yds 20 yds/sec | 200 yds 10 yds/sec |
| If $D_c$ = Then $V_c$ = | 100 yds 15 yds/sec (30 mph) | 100 yds 10 yds/sec | 100 yds 8 yds/sec | 100 yds 5 yds/sec |
| If $D_c$ = Then $V_c$ = | 25 yds 5 yds/sec (10 mph) | 25 yds 5 yds/sec | 25 yds 3 yds/sec | 25 yds 0 yds/sec |
| If $D_c$ = Then $V_c$ = | 10 yds 2 yds/sec (5 mph) | 10 yds 1 yds/sec | 10 yds 0 yds/sec | |
| If $D_c$ = Then $V_c$ = | 5 yds 1 yds/sec (2 mph) | 5 yds 0 yds/sec | | |
| If $D_c$ = Then $V_c$ = | 1 yds 0 yds/sec (0 mph) | | | |

*Fig.4*

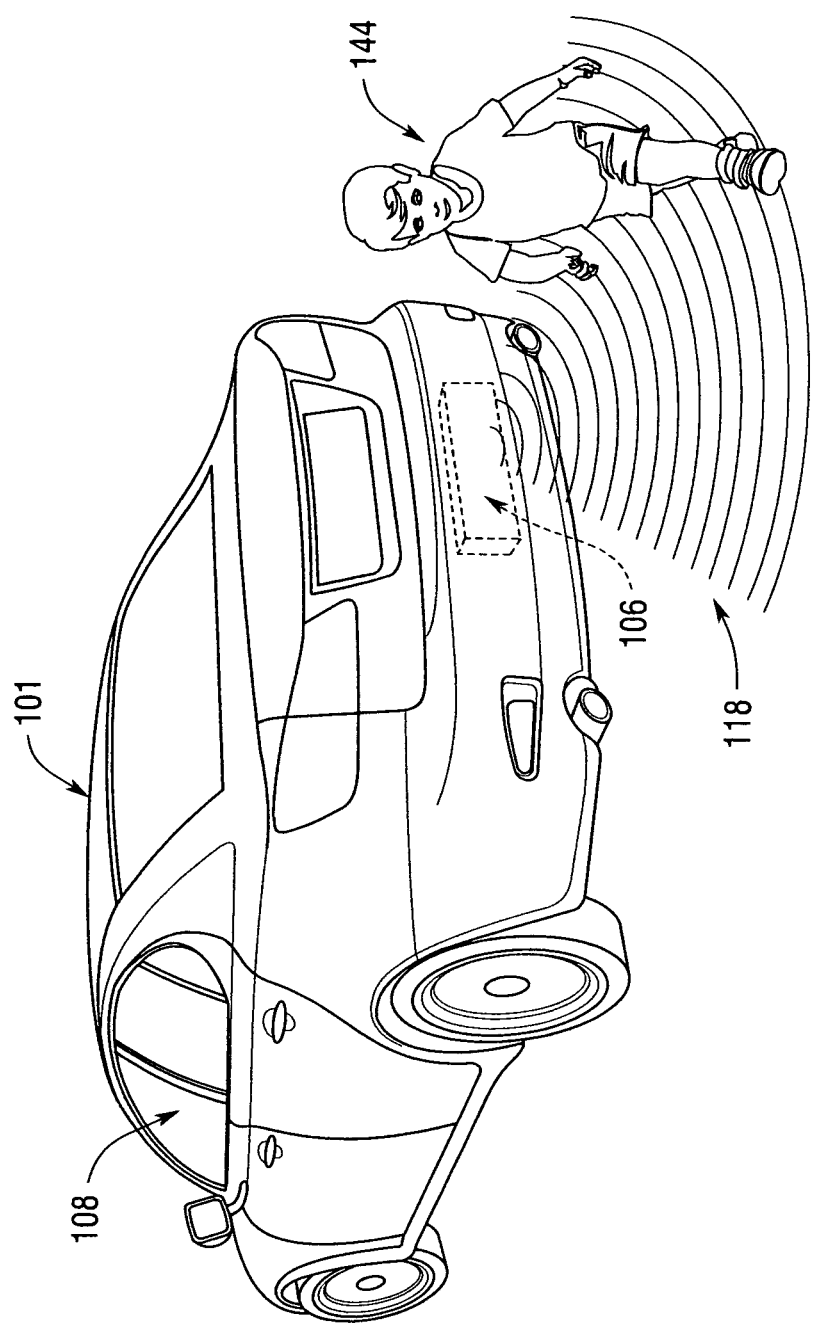

HOLISTIC CYBERNETIC VEHICLE CONTROL

TECHNICAL FIELD OF THE INVENTION

The invention relates to vehicle collision avoidance using integrated sensor inputs which feature continuous cross referencing resulting in automated vehicle control methods. The overall computer controlled system interacts with a vehicle operator allowing the operator to make the final decision as to how the vehicle will be operated.

BACKGROUND OF THE INVENTION

Automobile accidents are one of the most serious problems facing society today, both in terms of deaths and injuries, and in financial losses suffered as a result of accidents. The suffering caused by death or injury from such accidents is immense. Further, the costs related to medical treatment, permanent injury to accident victims and the resulting loss of employment opportunities and financial losses resulting from damage to property involved in such accidents are high. Providing the improved systems and methods to eventually eliminate these deaths, injuries and other losses deserves high priority. The increase in population and use of automobiles worldwide with the concomitant increased congestion on roadways makes development of systems for collision avoidance and elimination even more urgent. While many advances have been made in vehicle safety, including, for example, the use of seatbelts, airbags, and safer automobile structures, much room for improvement exists in automotive safety and accident prevention systems.

When a person begins a trip using an automobile, that person enters the vehicle and begins to drive. First, the vehicle moves out of a parking space and then, typically, onto a local or city road and then onto a highway. In leaving the parking space, the person may be at risk from impact of a vehicle traveling on the road. The operator must check his or her mirrors to avoid such an event. Several electronic sensing systems have been proposed which would warn the operator when a collision is likely. Once on the local road, the operator is at risk of being impacted from the front, side, and rear. Electronic sensors are available and are constantly being further developed to warn the operator of such possibilities. Similarly, the operator may run into a pedestrian, bicyclist, deer or other movable object and various sensors are also available that will warn the operator of these potential threats. The sensors include units that operate at radar, optical, infrared, ultraviolet or other electromagnetic frequencies. In addition there are other non-electromagnetic devices such as ultrasonic, motion and a variety of other sensors, each of which attempts to remove a eliminate collision events. Once the sensors detect an imminent event, appropriate countermeasures may be enacted, such as warning the operator through sensory stimuli or through automated action from a control program.

For example, U.S. Pat. No. 7,202,776 discloses a method and system for obtaining information about objects external to a vehicle. The method and system includes directing a laser beam from the vehicle into the environment, receiving from an object in the path of the laser beam a reflection of the laser beam at a location on the vehicle, and analyzing the received laser beam reflections to obtain information about the object from which the laser beam is being reflected.

In another example U.S. Pat. No. 7,188,012 discloses an adaptive voice control and vehicle collision warning and countermeasure system. The safety system includes a voice sensor that detects voice signals from a vehicle occupant. An occupant classifier determines the state of mind of the vehicle occupant. A controller performs a safety countermeasure in response to the state of mind of the occupant including the transmission of the state of mind to a target vehicle.

It should be noted that the prior countermeasures all rely on independent action from either the operator or the control programs to prevent collision events, rather than holistic integrated action from the human and machine combined. Such independent action by either the operator or the machine can lead to unintended consequences. For example, it is nearly impossible to program a machine to take into account all the variables of which an operator can be aware, and it is consequently inadvisable to make vehicle operating decisions based on machine output alone. Further, if the machine merely advises the vehicle operator verbally, the operator's reaction time may be too slow to evaluate and decide whether or not to use the machine advice. This could cause accidents to occur that the incorporation of the machine advice into the holistic performance of the vehicle could have avoided.

A more holistic system that allows the machine to advise and affect the operator's actions as the operator takes them but still leaves the operator in ultimate control is needed.

BRIEF SUMMARY OF THE INVENTION

A method for controlling a vehicle using holistic cybernetic vehicle control to prevent collisions is provided. The vehicle has a human operator and a vehicle control system that includes manual controls, a computer, sensors, control actuators, and information delivery apparatus for delivering information to the operator.

The cybernetic vehicle control system provides suggested actions to the operator through the manual controls and information delivery apparatus of the vehicle. To accomplish this, the holistic cybernetic vehicle control monitors the vehicle's external environment using sensors attached to or incorporated in the vehicle. The control system also monitors the operator using sensors to determine the operator's status.

The input of these sensors is used to identify potential collision threats and determine appropriate action to be taken by the control actuators and by the other information delivery apparatus. The system then uses various actuators to bias the operation of the manual controls or otherwise communicate the findings of the computer to the operator in response to a potential collision threat determined to exist by the computer.

The holistic cybernetic vehicle control system then continues modifying the actuated vehicle control actions and information delivery apparatus in response to additional input from the sensors.

The holistic cybernetic vehicle control system acts only as an advisor to the operator and the operator can override the suggested actions of the holistic cybernetic vehicle control when the operator deems it necessary.

An apparatus for controlling a vehicle using holistic cybernetic vehicle control to interface with a vehicle operator and prevent collisions is provided. The apparatus comprises various elements.

Manual controls similar to those found in most highway capable vehicles are used for controlling the vehicle.

Sensors are used for monitoring conditions inside and outside the vehicle.

At least one computer is used for determining control suggestions to the operator based on input from the sensors.

Control actuators are used for biasing the manual controls to deliver information from the computer to the operator in such a way that the operator can sense various suggested control actions through the feel of the controls in handling the vehicle.

Control actions can also be suggested to the operator by delivering information to the operator audibly and also by delivering information to the operator visually.

BRIEF DESCRIPTION OF THE DRAWINGS

Reference will be made in detail to embodiments of the invention, examples of which are illustrated in the accompanying drawing figures. The figures are intended to be illustrative, not limiting. Although the invention is generally described in the context of these embodiments, it should be understood that it is not intended to limit the spirit and scope of the invention to these particular embodiments.

FIG. 4 is a distance and velocity rule table;

FIG. 10 is a vehicle in detecting an obstruction behind the vehicle;

DETAILED DESCRIPTION OF THE INVENTION

Figure 1A:
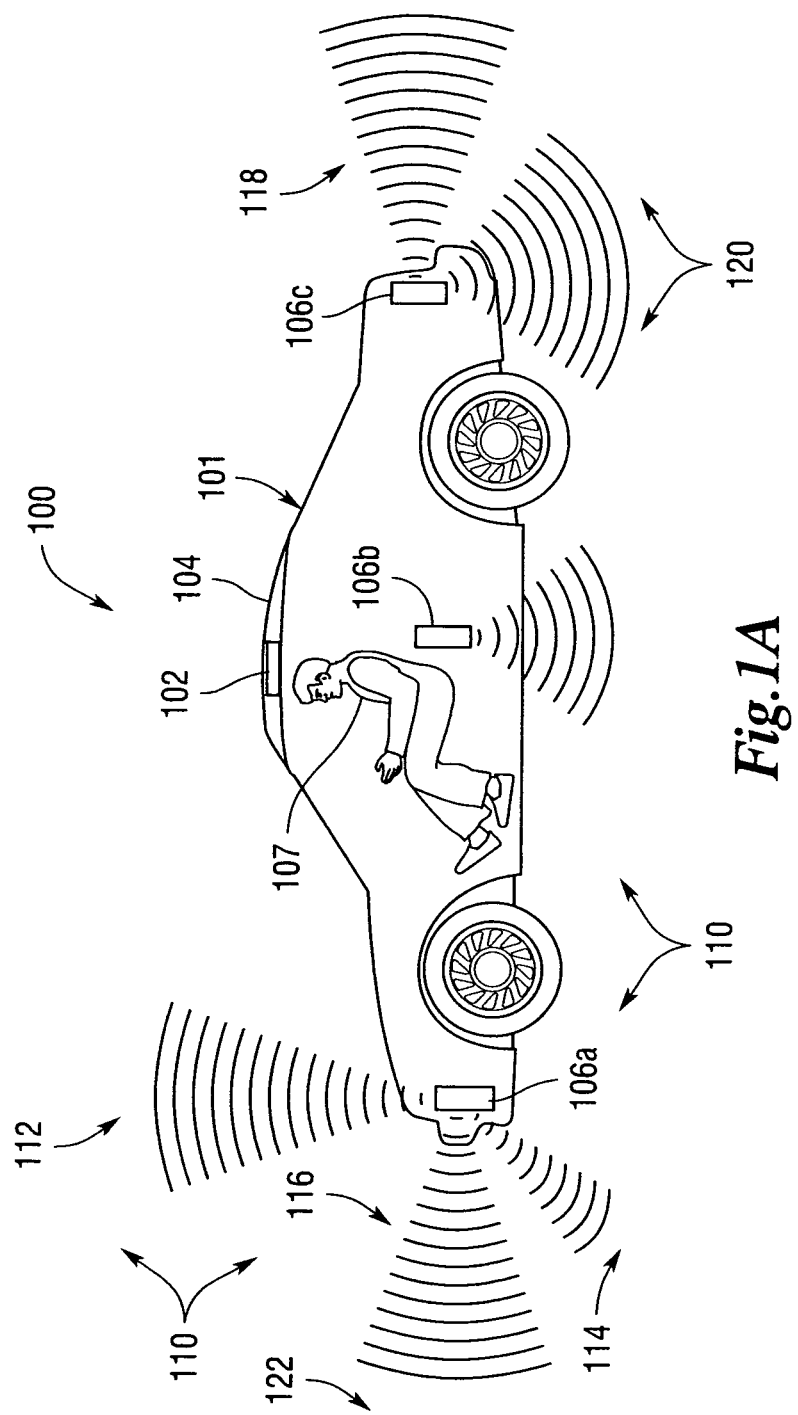
FIG. 1A is a mounted holistic cybernetic vehicle control system.

The invention integrates human and machine vehicle control action to improve vehicle operation and, particularly, to avoid collisions. This integration of human and machine vehicle control is called holistic cybernetic vehicle control herein.

Holistic cybernetic vehicle control enables the results of machine sensing and decision making to be communicated to the vehicle operator through the various senses of the operator. By providing machine advice to the operator through various vehicle functions and by integrating the machine advice with what the operator senses and perceives, holistic cybernetic control can result in much better and safer vehicle operation.

Similarly, the findings of the machine or cybernetic part of the holistic cybernetic system can also be communicated to other vehicle operators, though to a lesser degree since the cybernetic apparatus has access to fewer of the other operator's senses.

Holistic cybernetic control changes the feel of the way that a vehicle responds to its operator informing him of its cybernetic findings as he takes actions so that the machine advice becomes integrated with the action the operator is taking in a way that in a timely fashion informs the operator of potential problems but lets the operator make the final decisions on operation.

By way of simile, holistic cybernetic control is like having the advice of a second intelligence as you drive your vehicle, but the advice of the second intelligence is integrated in the way your vehicle performs.

In the discussion that follows the reader should note that commonly available electronic and mechanical parts can be used to achieve all the features of the invention. This includes sensing elements which can comprise passive sensors, active sensors comprising active signal emitters, or emitters with sensors in combination sometimes called emitter-sensors or emitter-receivers. In what follows the word sensor should be construed to refer to any of these individually or in combination.

A holistic cybernetic vehicle control system can include sensors such as infrared emitter receivers (IRER's), which can be directed emitters and receivers and can be connected to a central computer that monitors vehicle control actions: braking, accelerating and steering. Additionally, sensors can also monitor an operator's alertness.

Sensors such as the IRER's can detect the presence and activity of traffic and other objects, for example, in front of, behind, or alongside a vehicle. They can also detect traffic crossing a bidirectional roadway centerline and traffic in intersections. They can then transmit what they sense to a central computer for processing. Processing of the information collected is used to affect vehicle braking, acceleration, and resistance to steering in intuitive ways that alert the vehicle operator to the sensed situation. The processed information alerts the operator intuitively when the operator feels the computer biasing braking, acceleration, and resistance to altering steering direction. All final decisions are under the control of the operator of the vehicle who can overrule the findings of the computer by simply physically overcoming the biases that the computer places on the manual controls of the vehicle.

In one embodiment, a vehicle ahead of the operator's vehicle is sensed by a sensor. The closing velocity is calculated by a computer; and the holistic cybernetic vehicle control system attempts to maintain a predetermined distance between the vehicles taking into account sensed environmental and road conditions. The operator can overcome the computer biases on the controls that are used to advise or alert him by simply overcoming the biases. The biases must be set in such a way that they can be sensed by the operator but easily overcome. In this example the operator might push the brake pedal or accelerator to reposition the vehicle overcoming the control suggestions that he receives through the controls.

In another embodiment when backing up the vehicle, a sensor, perhaps an IRER, senses an object and stops the vehicle within one foot of the detected object.

From another aspect all the sensed vehicle activity can be broadcast and integrated with GPS information perhaps through electromagnetic signals to other vehicles that are similarly equipped with sensor interfacing, informing them of vehicle braking, accelerating, and steering performance. The operator and central computer work together to avoid collisions and maintain safe driving speeds, using sensed weather conditions such as rain, snow, ice, wind and other atmospheric conditions.

A feature of the invention is holistic interactive or cybernetic linking of the computer's control actions and the operator's manual control actions and/or reactions. An aspect of this linking is the use of computer-output-controlled actuators that simultaneously act, directly or indirectly, on the operative component of the vehicle (e.g., brakes on the wheels) and also on the manual controller usable by the operator for that operative component, for example, a brake pedal.

Aside from optional convenience functions, the control actions of the actuators are generally designed so that control actions, such as steering, accelerating, braking, flashing lights, horn sounding, and the like, will simultaneously affect vehicle operation while providing feedback that informs and warns the human operator of a potential threat. For example, the presence of environmental hazards can be felt by the operator in the way the vehicle acts. That is, biased braking, acceleration, and steering action can be invoked by the central computer, sometimes even before the operator becomes aware that there is a need for action. This serves to prompt the operator making the operator aware of the situation and the possible need for action.

By intuitively interacting with the operator through the process of monitoring the sensors, informing the operator of the evolving situation by issuing appropriate control actions, and detecting the new situation created by the operator's reactions and the environmental conditions, the vehicle control system integrates itself with the human operator to become a holistic cybernetic vehicle control system. Every computer issued control action that the vehicle control system enables and allows is incorporated with the operator's manual control actions in a cooperative interactive or holistic cybernetic relationship between the vehicle control system and the human operator.

Figure 1B:
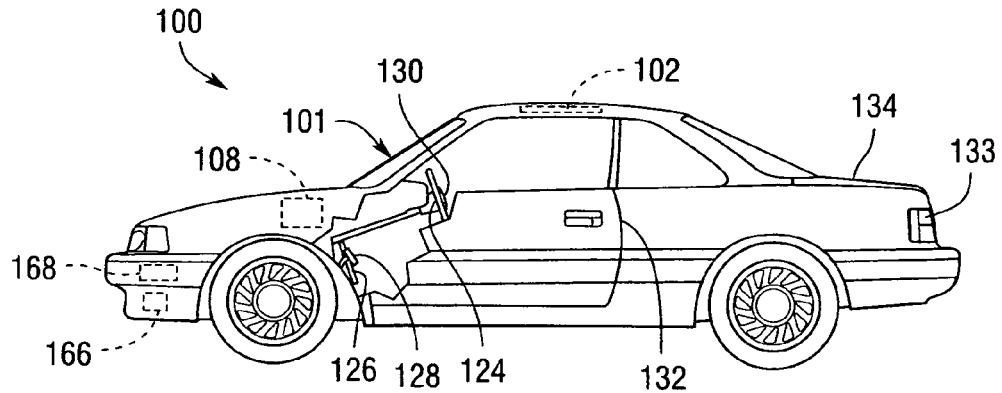
FIG. 1B is a mounted holistic cybernetic vehicle control system.

Referring to the figures, FIGS. 1A and 1B comprise apparatus elements of a holistic cybernetic vehicle control system mounted on a vehicle 100 with a human operator 107 seated in the vehicle 101. Although the control system can be built into a new vehicle 101 as an integrated original equipment system, selected portions or the entire control system can, alternatively, be retrofitted into a vehicle 101 as an aftermarket enhancement.

Although many elements of the holistic cybernetic vehicle control can be placed anywhere throughout the vehicle, in one embodiment as many elements as possible of the control system apparatus are mounted in or on the top or roof of the vehicle 104. Referring to FIG. 1A, the mounted holistic cybernetic vehicle control system 100 includes a computer 102, which is operatively connected to condition sensing and computer input reporting devices, collectively referenced as sensors 106, that are shown mounted, for example, at the vehicle's front end (front sensors 106a), sides (side sensors 106b), and back end (rear sensors 106c). The computer 102 constantly monitors all sensors cross referencing to check for unit or multiple unit failures and possibly redirecting one or all of the sensors to correct for the failure of any one unit. The sensors 106 are positioned as needed for sensing ambient conditions 110 around the vehicle 101, the conditions 110 comprising one or more of weather conditions 112; road conditions 114; and objects and their movements in: the area 116 in front of the vehicle 101, the area 118 behind the vehicle 101, the area 120 behind and beside the vehicle 101 in an adjacent lane, and the area 122 of an intersection being approached by the vehicle 101. A wide variety of suitable sensors are available.

For example, in one embodiment emitter receivers similar to those used by cameras for auto focusing can be used as the sensors.

Referring to FIG. 1B, the computer 102 is also operatively connected to computer controlled output devices 108 that the computer 102 uses to issue control actions to various components on the vehicle 101. These output devices are collectively referenced herein as control actuators 108. Examples of vehicle components including manual controls usable by the operator 107 that can receive control actions from the control actuators 108 comprise steering assembly 124, engine accelerator assembly 126, brake assembly 128, horn 130, rear lights 133, and optional convenience implementing components such as doors 132, and trunk hatch 134.

The control actuators 108 generally include feedback sensors which, in addition to providing control feedback used by the actuator 108, can input the feedback data to the computer 102 to enable it to determine, for a given vehicle component, the net result of a control action output by the computer 102 to the actuator 108. Any control action taken by the operator 107 can also be included in the feedback to update the system in real time and provide machine based advice based on the current situation sensed by the computer 102. The computer 102 then adjusts the actuators to suggest proper action to the operator 107 via the holistic cybernetic vehicle control system 100.

In effect the operator 107 has a copilot. That is, there are two operators—one alive and one inanimate—with the human operator 107 making the final decisions and with the inanimate operator making suggestions by adjusting how the vehicle 101 feels to the operator 107, but the inanimate operator is not able to overrule the final decisions of the human operator 107, who can easily overrule the decisions of the inanimate operator.

The reader should note that while the computer 102 can communicate with the operator 107 optically or audibly, the holistic cybernetic control system 100 communicates with the operator 107 in the most natural way possible and in a way wherein the operator 107 does not have to spend excessive time interpreting before acting upon the cybernetic information.

For example, if another vehicle is detected adjacent the holistic cybernetically controlled vehicle 100, when the operator 107 starts to change lanes, the computer 102 will add resistance to turning the steering wheel 124 when the operator 107 tries to steer into the other vehicle. However, the added resistance will be small enough to be easily overcome should the vehicle operator 107 need to change lanes anyway. The added resistance will simply notify the operator 107 that the operator 107 should double check the adjacent lane before changing lanes. Further, since the communication is by feel in the steering wheel 124, the operator 107 will have immediate warning and will not have to depend on interpreting a spoken warning from the computer 102.

It can be seen that an important feature of the present invention is interactive or holistic cybernetic linking of the computer's 102 control actions and the operator's 107 manual control actions and/or reactions. An aspect of this linking can be seen in the use of computer controlled actuators, such as the control actuators 108 that simultaneously act, directly or indirectly, on the operative component of the vehicle 101 and also on the manual controller usable by the operator 107 for that operative component. Therefore, herein the descriptive name for a vehicle 101 component may vary between the name of the operative component and the name of its manual control, while having a single corresponding reference number.

For example, the control actuator for the brakes 128 also controls corresponding movement of the operator's brake pedal 128 and therefore both are referenced with the same number. Similarly, feedback sensors integrated with the control actuators 108 may sense actuator activity (e.g., movement of brake pads against a brake drum, plus controlling force applied to the brake pedal); and/or results of the activity (e.g., wheel rotational speed, and brake pedal position). Thus, a control actuator 108 for a vehicle component (e.g., brakes/brake pedal 128) may include a plurality of operational elements and/or integrated feedback sensors, for which a reference number is implied to be 108 since they are to be understood as sensors of the mounted control system 100 that are functionally integral with a related actuator 108, whether or not its feedback sensor(s) is actually located in the same housing as the acting part(s) of the actuator 108.

Figure 2:
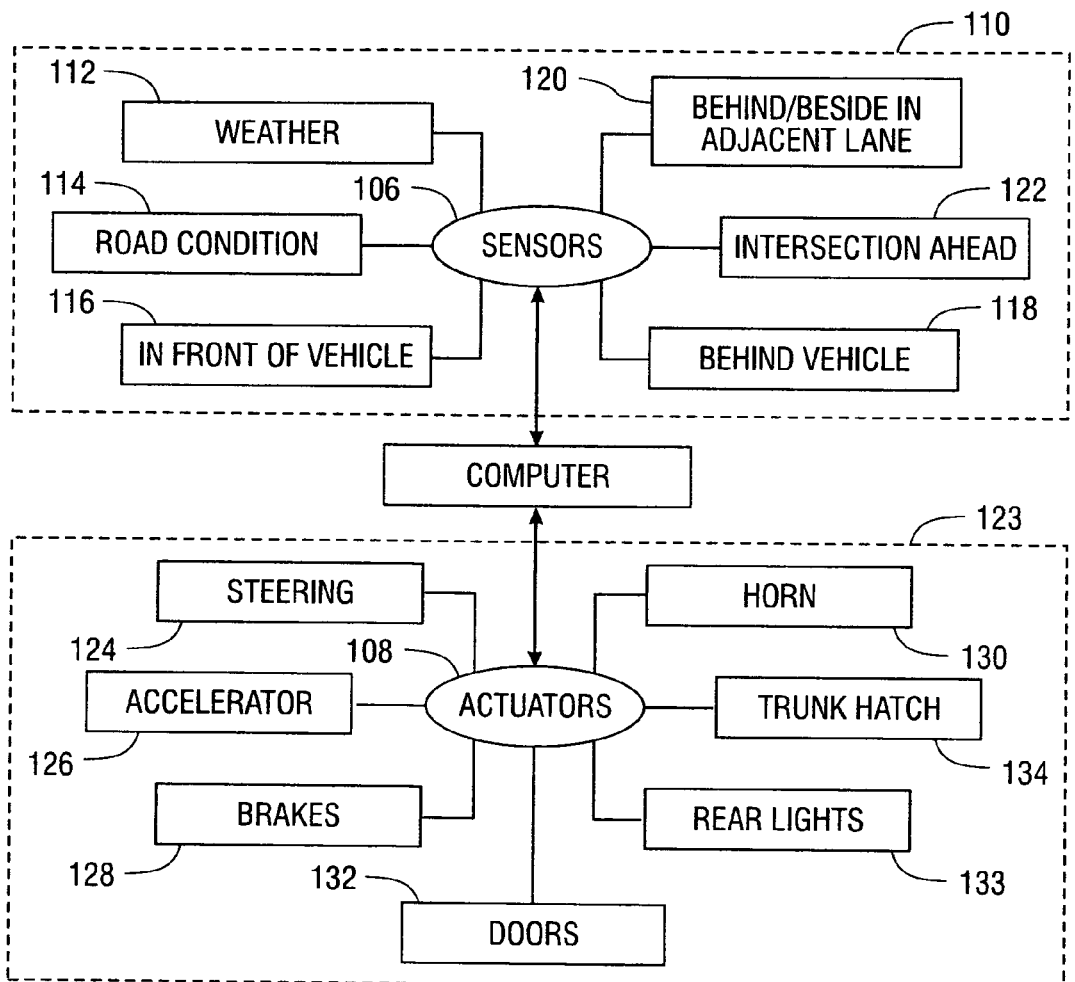
FIG. 2 is the relationship between elements comprising a holistic cybernetic vehicle control system.

In one embodiment FIG. 2 illustrates the relationship between the computer 102, sensors 106, and control actuators/components 108. The sensors 106 monitor ambient conditions 110 external to the vehicle 101 by sensing/detecting at least some of the following: weather conditions 112 (e.g., rain, snow, ambient light level), road condition 114 (e.g., wet, dry, ice, sand/mud), the area in front of the vehicle 116, the area behind the vehicle 118, the area behind and beside the vehicle in an adjacent lane 120, and the area of an intersection 122 being approached (including, for example, pedestrian crossings). Any one of the sensors 106 may run continuously, run only when the vehicle 101 is turned on, only when it is moving, or in any other mode as needed. The sensors 106 may repeat measurements and report sensed data to the computer 102, either automatically and/or under control of the computer 102; which uses sensor data to assess, for example, potential collision threat levels and to determine appropriate control actions. If the computer 102 identifies a need for action (e.g., a potential collision threat), it determines and then issues appropriate control actions to one or more of the control actuators 108, which have at least partial control over the holistic cybernetic vehicle components 123 such as those listed above. The control actuators 108 then carry out the control actions and pass back to the computer 102 the results according to the actuator's feedback sensors 108.

The mounted holistic cybernetic vehicle control system 100 utilizes physical apparatus elements, including a computer 102, to implement steps of an inventive method embodied in a control program run by the computer 102. Therefore, both the inventive method(s) and the apparatus elements inventively configured into an inventive system of physical elements are intended to be encompassed by the collective term holistic cybernetic vehicle control system 100, including any subsets thereof.

Figure 3:
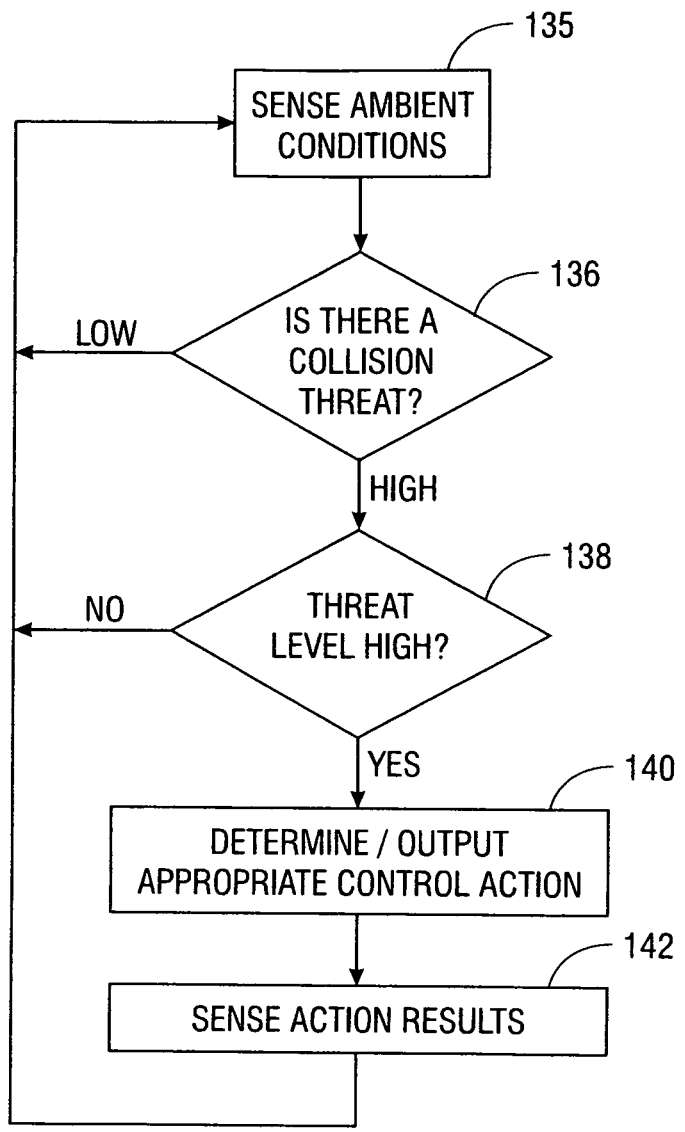
FIG. 3 is a control flow diagram.

In another embodiment FIG. 3 shows a typical flow of information gathering and decision making for collision avoidance based on ambient conditions for the vehicle control system 100. In general, the control system 100, using its computer 102, monitors the sensors 106 to sense ambient conditions 135. If the sensors 106 detect a potential collision threat 136, then the computer 102 will assess the collision threat level 138 using processes discussed below. If the computer 102 determines that the potential collision threat has a low enough threat level 138 according to predetermined decision rules, it will do nothing. However, if the computer 102 determines that the potential collision threat has a high threat level 138, it will determine and initiate an appropriate control action or actions 140. The human operator 107 can react to the potential collision threat and/or to the control system 100 control actions by manually implementing his or her own control actions. Ambient conditions 110 can also cause unpredicted results (e.g., running over a patch of ice while braking). Therefore, the computer 102 will read data from the actuator 108 feedback sensors in order to sense the actual net result 142 of all the preceding actions, reactions, and ambient effects. Finally the computer 102 continues the vehicle control system by looping back to monitoring the ambient condition sensors 106 to sense the ambient conditions 135. The vehicle control system method 100 process of assessing collision threat potential 136 and threat level 138, initiating appropriate control actions 140 if needed, and accommodating operator actions and ambient effects will continue until the computer 102 determines that the potential collision threat is gone 136 or has a safely low collision threat level 138.

The control actions of the actuators 108 are generally designed such that a control action such as steering, accelerating, braking, flashing lights, horn honking, and similar processes will simultaneously affect the vehicle operation and also provide feedback that intuitively informs and/or warns the human operator 107 of a potential collision threat. By intuitively interacting with the operator 107 through the process of monitoring the sensors as in 135, informing the operator 107 of the evolving situation by issuing appropriate control actions 140, and detecting the new situation created by the operator reactions and the environmental conditions 142, the vehicle control system 100 integrates itself with the human operator 107 to become a cybernetic vehicle control system 100. Thus, for every computer issued control action 140 the vehicle control system 100 initiates, the vehicle control system programming incorporates the operator's manual control actions in a cooperative interactive cybernetically based relationship between the vehicle control system 100 and the human operator 107.

Feedback or information given to the operator 107 by the control system 100 is made intuitive by alerting or informing the operator 107 about a given threat through bias that the operator 107 can sense in movement of the manual controls which the operator 107 uses to effect the control action best suited for responding to the given threat.

This method of communication between the operator 107 and the holistic cybernetic vehicle control system is a necessary improvement over prior art because a dashboard warning light or audible alert signal, even if in the form of a spoken message, consumes valuable time while the operator 107 notices the alert, determines its meaning, and then determines how to respond most appropriately. In case of urgent situations, the operator 107 can only cut the time shorter by acting or reacting without thinking, and this can lead to inappropriate control actions that have potentially undesired consequences. Unlike these other methods of communication with the cybernetic system, intuitive feedback does not have to be processed through the eyes or ears, then the conscious brain, and finally to the muscles. Instead, audio and motion feedback is directly applied to, and felt by, the same muscles that need to perform the appropriate vehicle control action. The limitations of human reaction time are further addressed by the control system 100 in that implementation of the computer 102 determined best control action has already been started by the time that the operator 107 can react, so if the system's control action appears adequate to the operator 107, the operator need not do anything except monitor its progress, now at a heightened state of awareness. However, if the system's control action appears inappropriate to the operator 107, the operator 107 can react by overriding the action, and the overriding action is easily accomplished by implementing the opposite of what the operator 107 feels happening in the manual controls, or by resisting the computer actuated action on the manual control.

Examples of intuitive informative control actions by the vehicle control system 100 include the following:

biasing or moving a brake pedal 128 in proportion to the amount of force applied by the control system 100 to the wheel brakes 128;

biasing or moving an accelerator pedal 126 down or up in proportion to the amount of engine acceleration or deceleration, respectively, applied by the control system 100;

biasing or moving a steering wheel 124 in the direction of, and in proportion to, the wheel steering 124 applied by the control system 100; and moving a horn button 130 or light switch 133 in accordance with horn blowing 130 or light flashing 133, respectively, applied by the control system 100.

By way of example, in one embodiment FIG. 4 is a table showing maximum allowed closing velocities Vc for two vehicles approaching each other, vehicle A and vehicle B. For different closing distances, Dc, and vehicle B velocities, Vb, relative to vehicle A, different closing velocities, Vc, are allowed before the holistic cybernetic vehicle control system takes action to prevent a collision. In this embodiment normal dry road conditions 114 and normal visibility/weather/daylight conditions 112 are assumed. Depending on any changes from such normal conditions the computer could change the parameters of FIG. 4 according to the conditions sensed.

The table encompasses results of the kinds of calculations conducted by, and predetermined limits used by the computer 102 in determining collision threat potential 136, collision threat level 138, and appropriate control actions 140 according to the method of the vehicle control system 100. In the table of FIG. 4, "vehicle A" is the vehicle 101 that is using the vehicle control system 100, and "vehicle B" is an object, for example another vehicle, that is being observed to determine if it is a potential collision threat. Of course, Vehicle B, the potential collision threat, could be any object in the areas being monitored by the sensors 106. The following are examples of these objects: a car moving away from or towards the vehicle 101, a pedestrian crossing the roadway, a stationary object like a crate fallen onto the road (in which case Vb is zero, and vehicle 101 velocity Va equals the closing velocity Vc). Velocities are listed in yards per second (yps) and sometimes in miles per hour (mph). Closing distance Dc is listed in yards and represents the instantaneous distance between the vehicle 101 (vehicle A) and the object (vehicle B). It can be seen that calculations according to this table take into account assured stopping distances of the vehicle 101 under a given set of ambient conditions 112, 114 (and tires, vehicle weight, etc.) by causing the computer 102 to control the vehicle 101 velocity Va such that closing velocities Vc are limited to safe maxima. This is comparable to operator 107 attempting to maintain "safe" closing distances Dc while moving.

Figure 5A:
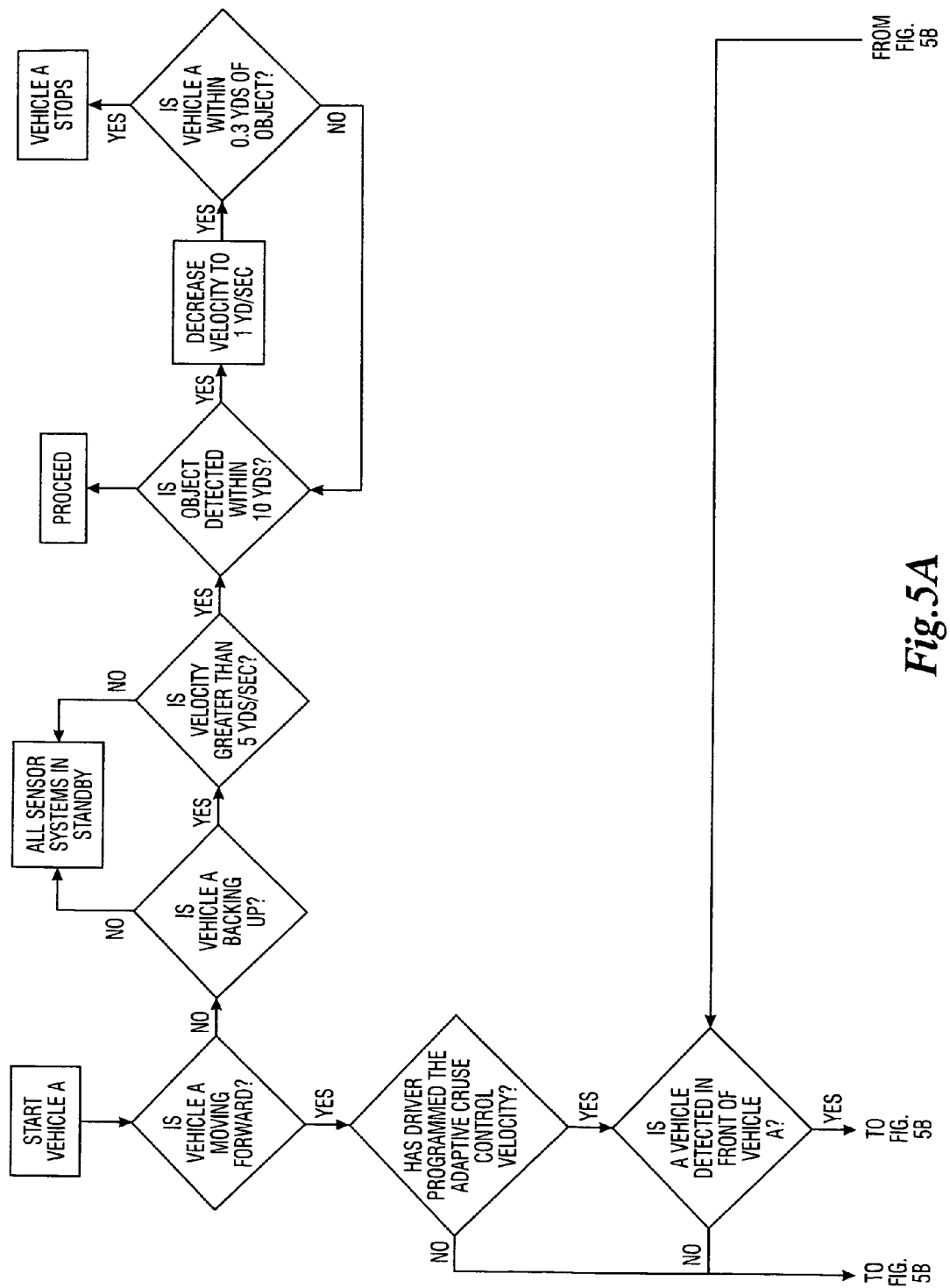
FIGS. 5A-5C are a flow diagram.
Figure 5B:
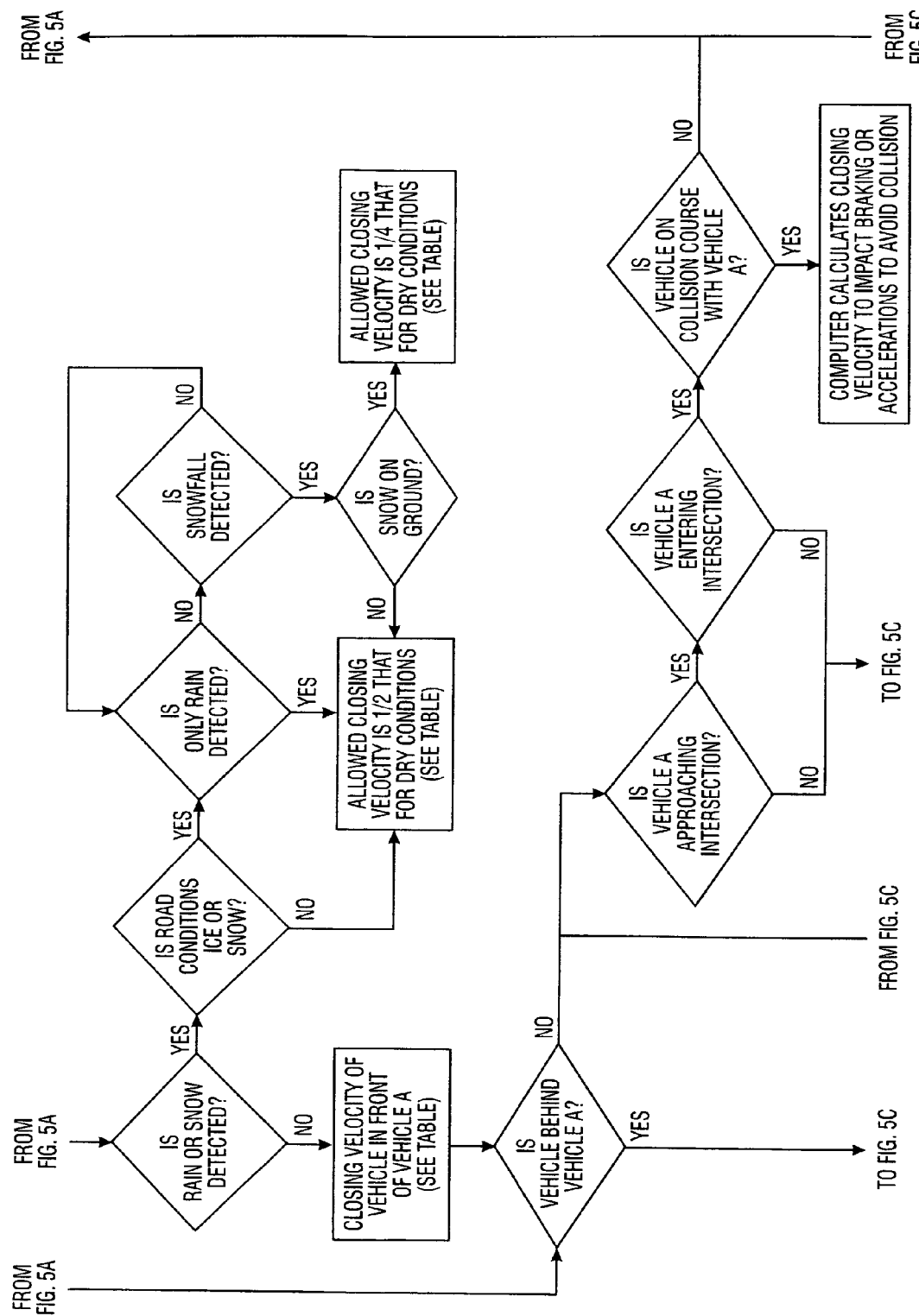
Figure 5C:
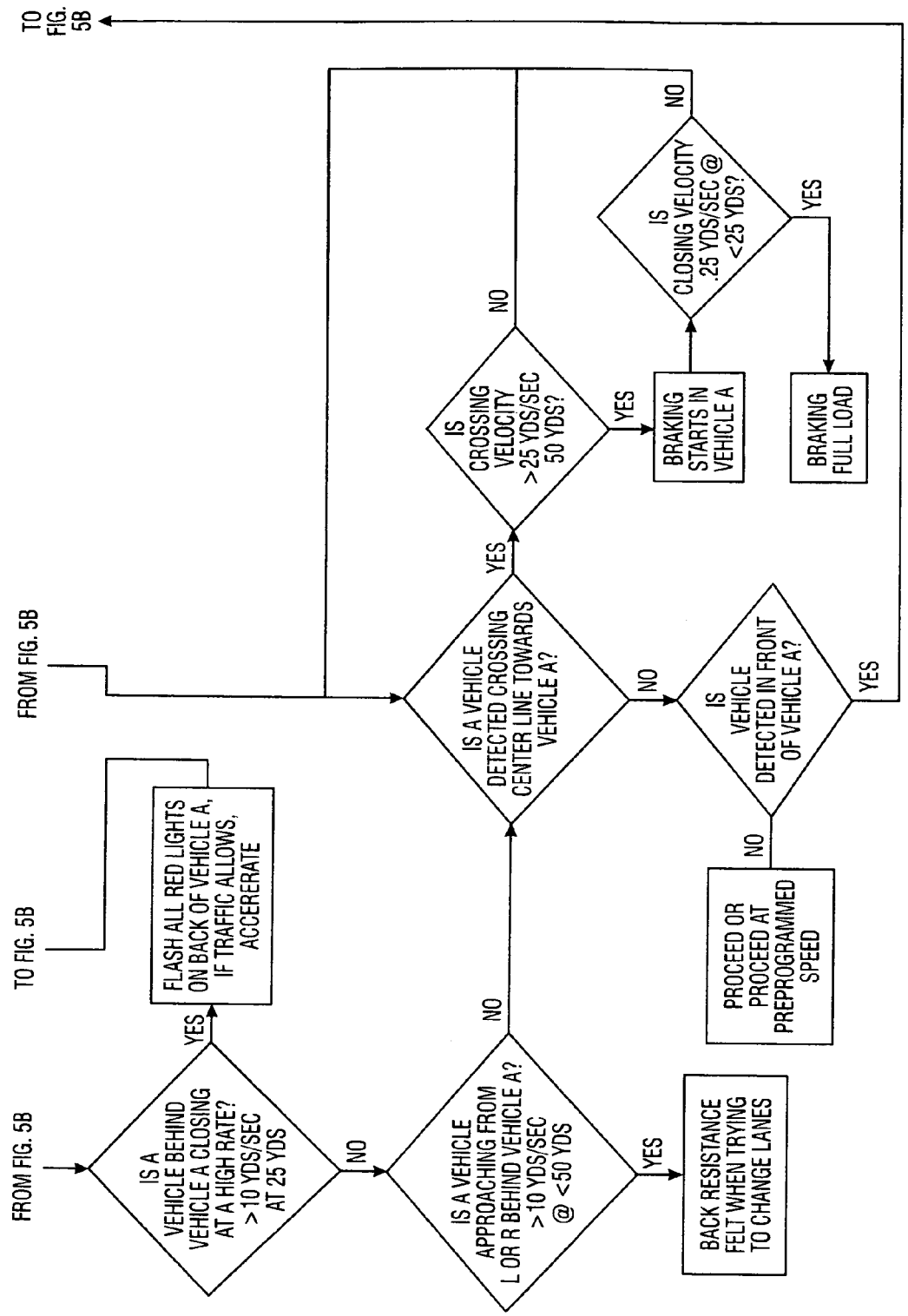

In another embodiment FIG. 5 is a control flow diagram showing examples of decisions and control activities incorporated in the vehicle control system 100 in more detail. As shown, the flow diagram indicates typical inputs needed and decisions that need to be made to accomplish holistic cybernetic control of a vehicle. The flow of decisions and inputs shown is unique to the particular control needs of the embodiment.

It should be noted that in any particular embodiment the decision flow can be changed as needed to correspond to the particular vehicle to which holistic cybernetic control is being applied. For example, the flow diagram for a truck could be different from that for a car incorporating decision flow and sensors that check heights and do calculations to make sure that overhead obstructions are high enough to allow the truck to pass under them.

As the needs of a particular embodiment are determined and as experience in that environment is gained, the flow chart can be modified to comply with the physical environment in which holistic cybernetic control will be used. For example, required holistic cybernetic control decisions would be different for a tow motor in a factory than the decisions needed for a car used on a public roadway. Because the operator always makes the final decision during operation, this updating can constantly improve the operation of the holistic cybernetic control system improving control safely and effectively.

As can be seen in the FIG. 5 flow diagram, after a series of decisions, an action is taken. The chart does not show how the actions of the cybernetic control can be overturned by the actions of the operator. However, methods for reversing the decisions of the cybernetic control are straight forward and can generally be accomplished by performing the manual action that would be the opposite of the action taken cybernetically. For example, the application of full braking by the cybernetic system could be reversed by merely touching the accelerator 126 of the vehicle, or the operator 107 could take over the braking action by stepping on the brake pedal 128.

Figure 6A:
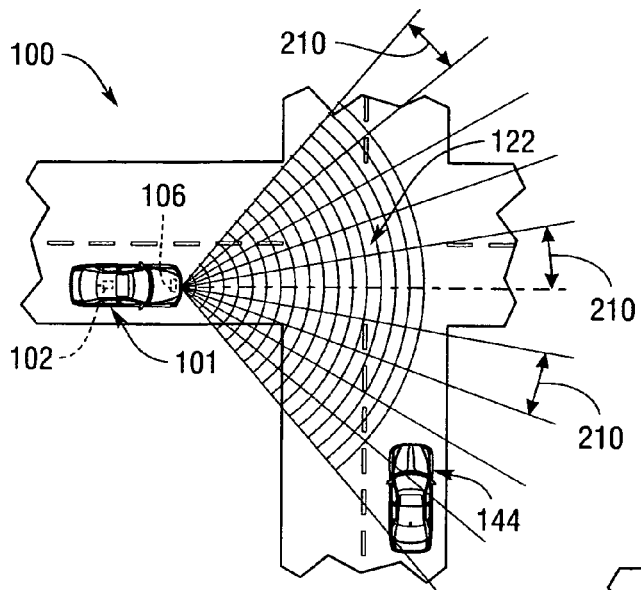
FIGS. 6A-6C are a vehicle passing through an intersection.
Figure 6B:
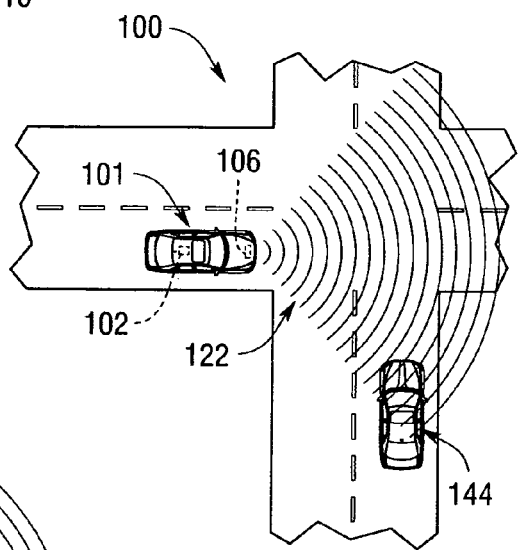
Figure 6C:
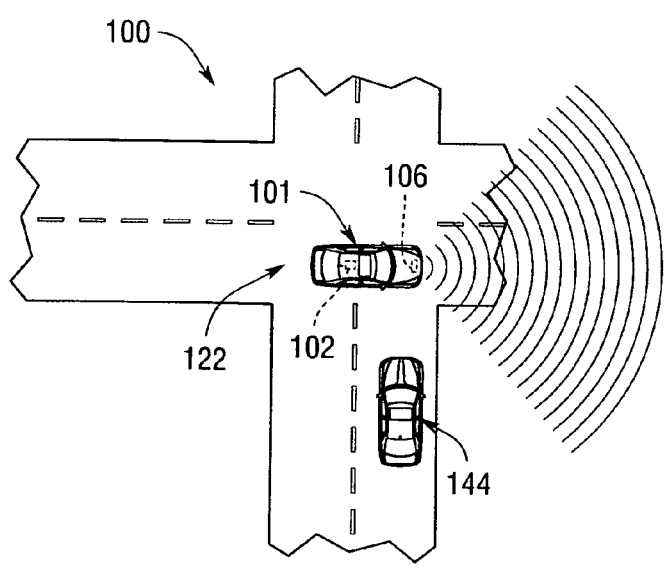

In another embodiment FIGS. 6A-6C illustrate the holistic cybernetic control system 100 being applied to a situation wherein the sensors 106 detect a potential collision threat 144 in the area of an intersection 122 being approached by the vehicle 101 as in FIG. 6A.

In this embodiment an array of sensors, in this case a plurality of IRER's, are directed from the centerline of the vehicle 101 with five IRER's facing forward at 10° intervals 210 on each side. The road and intersection being approached are being monitored by five IRER's on the right and five on the left side of the vehicle for a total monitoring angle of 50° to the right and 50° to the left from straight ahead of the vehicle. As the vehicle 101 approaches an intersection, the vehicles approaching from right and left are detected by the array and depending on the vehicles' distance and velocity approaching the intersection, the change in information from each of the ten IRER's are interpreted by the computer 102 to determine the relative motion of vehicles approaching the intersection. The integration of all IRER's and the IRER array inputs determine the action necessary for the IRER equipped vehicle to avoid collision. The computer 102 decides whether the potential collision threat 144 has a high threat level 138 by determining whether the potential collision threat 144 will intersect with the current movement of the vehicle 101. If so, the computer 102 determines whether the safest course of action is to accelerate or to brake, then takes the appropriate course of action 140, as shown in FIG. 6B (slowing/stopping) or FIG. 6C (accelerating). The computer 102 then continues vehicle control action until the computer 102 determines that the potential collision threat 144 is gone 136 or has a safely low collision threat level 138.

Figure 7A:
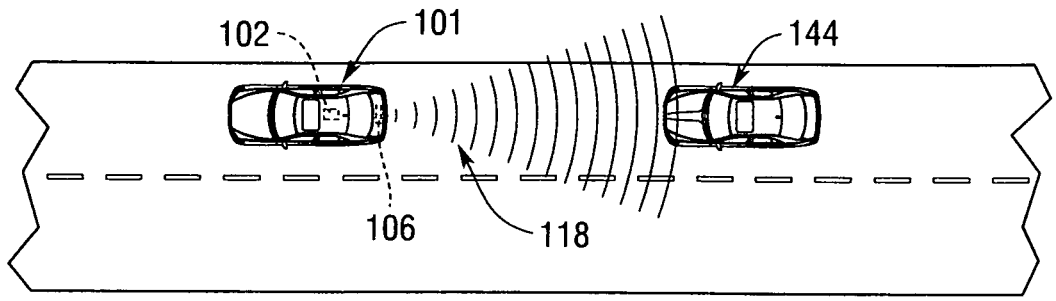
FIGS. 7A-7B are a vehicle approaching another from the rear.
Figure 7B:
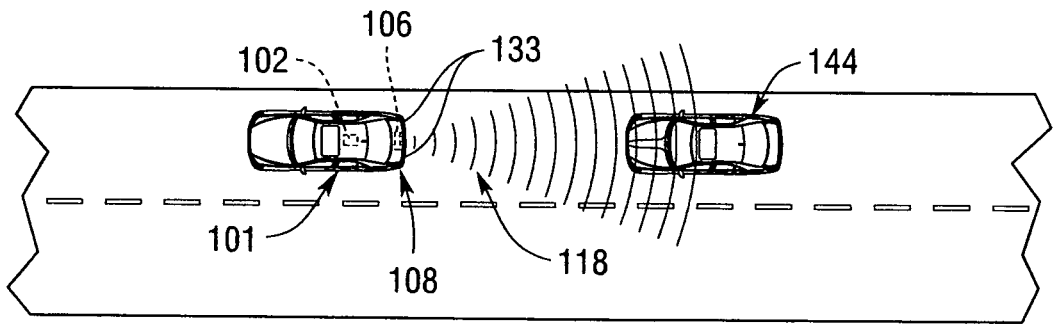

In yet another embodiment FIGS. 7A and 7B illustrate the control being applied to a situation wherein the sensors 106 detect a potential collision threat 144 in the area 118 behind the vehicle 101, see FIG. 7A. The computer 102 decides whether the potential collision threat 144 has a high collision threat level 138 by determining whether the closing velocity of the potential collision threat 144 exceeds a predetermined threshold, as in, for example, FIG. 4. If so, the computer 102 issues a control action 140 to the control actuator 108 that flashes the rear lights 133 and causes the vehicle 101 to accelerate if there is no object in front of the vehicle.

The vehicle operator 107 will then detect the acceleration allowing human interaction as the threat vehicle 144 approaches closer, as in FIG. 7B. The computer 102 then continues its cybernetic vehicle control activity until the computer 102 determines that the potential collision threat 144 is gone 136 or has a safely low collision threat level 138.

Figure 8:
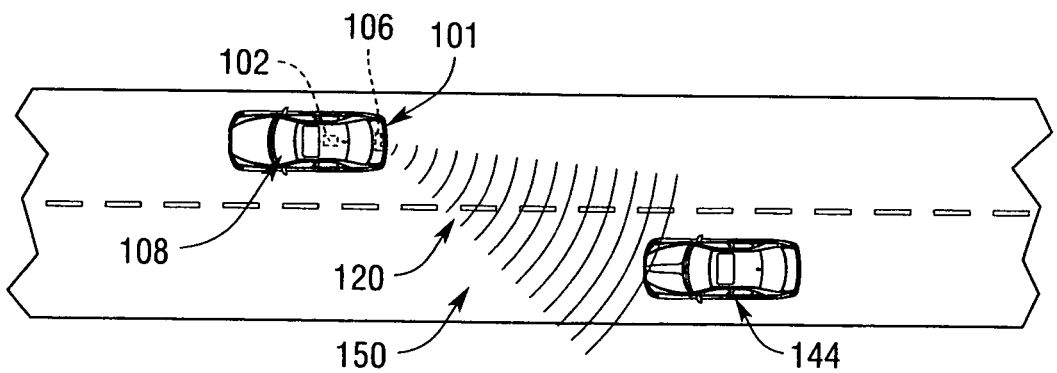
FIG. 8 is a vehicle approaching another from the rear in an adjacent lane.

FIG. 8 illustrates the control system method 100 being applied in another embodiment to a situation wherein the sensors 106 detect a potential collision threat 144 in the area 120 in an adjacent lane 150 behind and/or beside the vehicle 101. The computer 102 decides whether the potential collision threat 144 has a high collision threat level 138 by determining whether the relative velocity of the collision threat 144 exceeds a predetermined threshold given the relative positions of the vehicle 101 and the threatening vehicle 144. If so, the computer 102 issues a control action 140 to the control actuators 108 that applies resistance to the steering wheel 124 if the human operator 107 attempts to turn it in a way that would direct the vehicle 101 into the adjacent lane 150. Thus informed of the threat, the vehicle operator 107 can overcome the applied resistance, also called bias, if the operator 107 deems it necessary to make the turn into the other lane 150. The computer 102 then continues the vehicle control activity until the computer 102 determines that the potential collision threat 144 is gone 136 or has a safely low collision threat level 138.

Figure 9A:
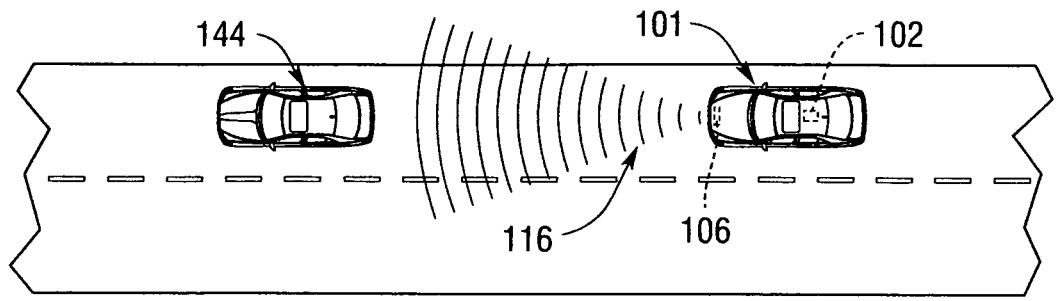
FIGS. 9A-9C are a vehicle approaching another vehicle from the rear in the same lane.
Figure 9B:
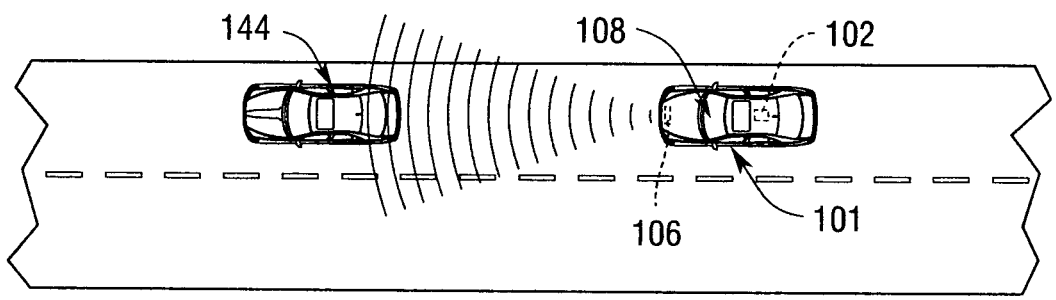
Figure 9C:
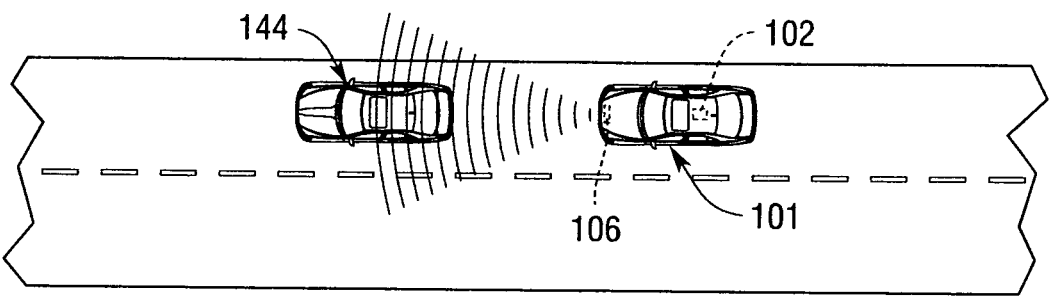

Another embodiment shown in FIGS. 9A-9C illustrates the control system method being applied to a situation wherein the sensors 106 detect a potential collision threat 144 in the area 116 in front of the vehicle 101. The computer 102 decides whether the potential collision threat 144 has a high collision threat level 138 by determining whether the closing velocity to the potential collision threat 144 exceeds a predetermined threshold by consulting a rule set similar to that presented in FIG. 4. If so, the computer 102 issues a control action to the control actuators 108 that decreases the velocity of the vehicle 101 by a calculated amount, and in so doing notifies the operator 107 of its findings. The computer 102 then continues the vehicle control activity according to its rule set similar to that presented in FIG. 4 until the computer 102 determines that the potential collision threat 144 is gone 136 or has a safely low collision threat level 138.

Using a rule set similar to that in FIG. 4 the relative closing velocity and distance to the object, be it a post, vehicle, human, animal, or other object, will be calculated with the result that the vehicle 101 will adjust its speed, or it will stop before contacting the object, thus preventing a collision. The distance from vehicle 101 to the threat object, in this case another vehicle 144, that is allowed by the computer 102 can be a function of the relative speed between the two vehicles and can depend on the closing velocity between the vehicles 101, 144. Because the holistic cybernetic vehicle control system can be highly accurate depending on the quality and nature of the sensors, actuators, and controls used, the computer 102 can control the speed of the vehicle 101 very precisely stopping as little as 1 meter or even less from the potential collision threat 144.

In another embodiment as shown in FIG. 10 the control system is applied to a situation where the vehicle 101 is in reverse and the sensors 106 detect a potential collision threat 144, for example a child, in the area 118 behind the vehicle 101. The computer 102 decides whether the potential collision threat 144 has a high collision threat level 138 by determining whether the closing velocity to the potential collision threat 144 exceeds a predetermined threshold. If so, the computer 102 issues a control action to the control actuators 108 that decreases the velocity of the vehicle 101 by a calculated amount again resulting in the vehicle 101 stopping at a predetermined distance from object 144. The computer 102 then continues the vehicle control activity until the computer 102 determines that the potential collision threat is gone 136 or has a safely low collision threat level 138.

It should be noted that although the examples herein center on a vehicle 101 and just one potential threat object 144 with only the vehicle 101 equipped with a holistic cybernetic vehicle control system 100, the invention is easily extended to a plurality of potential collision threats 144 with only one vehicle 101 equipped with a holistic cybernetic vehicle control system 100. In this case the computer 102 must keep track of each individual threat 144 detected and calculate a safe passage through the collection of potential collision threats 144 guiding and transferring its findings and recommendations based on sensor input to the equipped vehicle's 101 operator 107 through the vehicle's 101 manual controls and other information delivery apparatus.

In multiple vehicle collision threat scenarios, the vehicle control system 100 will have more and potentially better options for threat resolution if a plurality of the vehicles is equipped with computer-integrated sensors and actuators relating to vehicle braking, accelerating, and steering.

If the vehicle control system 100 has been implemented in all the vehicles and the computers in each vehicle are in communication a solution for moving all the vehicles without collision can be determined. The sensed vehicle activities and ambient conditions for each vehicle can be broadcast and integrated with other information such as Global Positioning System (GPS) information to enable joint determination of collision threat removal actions by all the computers in concert.

However, some of the vehicles in such a situation could be unequipped with the holistic cybernetic system 100. In this case sensor inputs will allow the equipped vehicles to keep track of the unequipped vehicles and the computers that are in communication with each other can again determine a safe course of action for all the equipped vehicles to follow avoiding collisions between the unequipped vehicles and themselves The remaining figures illustrate embodiments of the invention 100 that include optional convenience features that are easily implemented using sensors 106 and actuators 108 in an expanded version of the holistic cybernetic vehicle control system 100.

Another embodiment is shown in FIG. 11 which illustrates how the invention could be applied to a parked vehicle to provide convenience functions for an operator or a passenger. Referring to the overall flow chart in FIG. 3, the decision steps 136 and 138 regarding determination of collision threat potential 136 and threat level 138 are supplemented by a decision step that would determine and issue appropriate control actions 140 when the sensors 106 have sensed a vehicle key and its location while the vehicle 101 is parked.

Figure 11A:
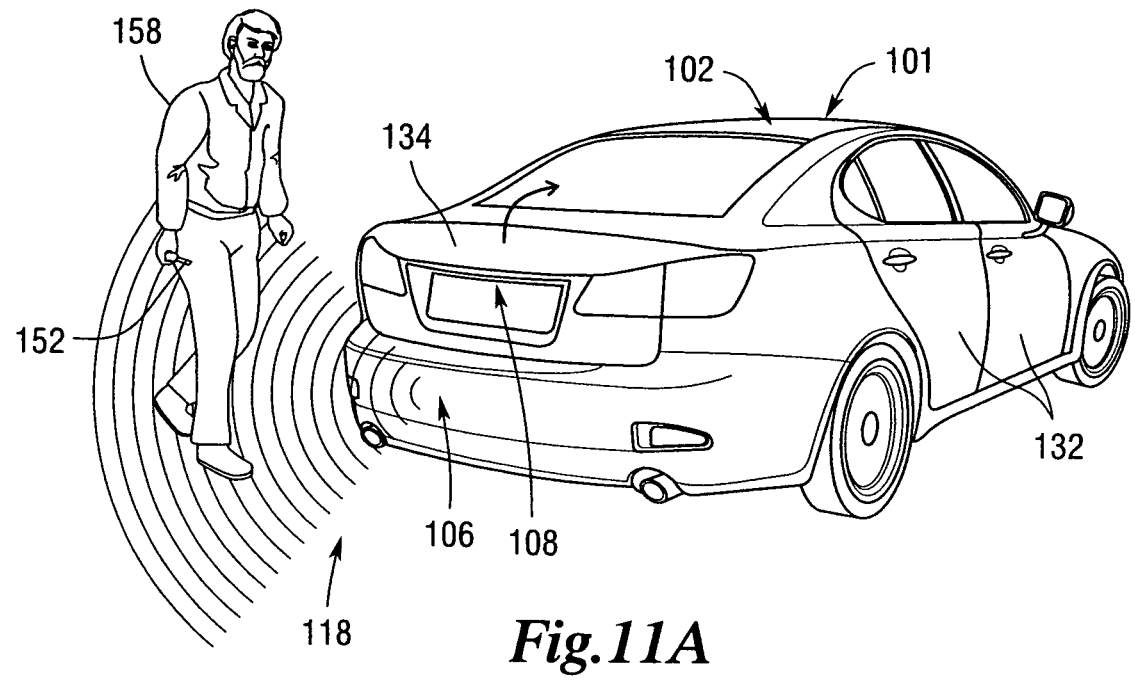
FIGS. 11A-11B are convenience features for a parked vehicle.
Figure 11B:
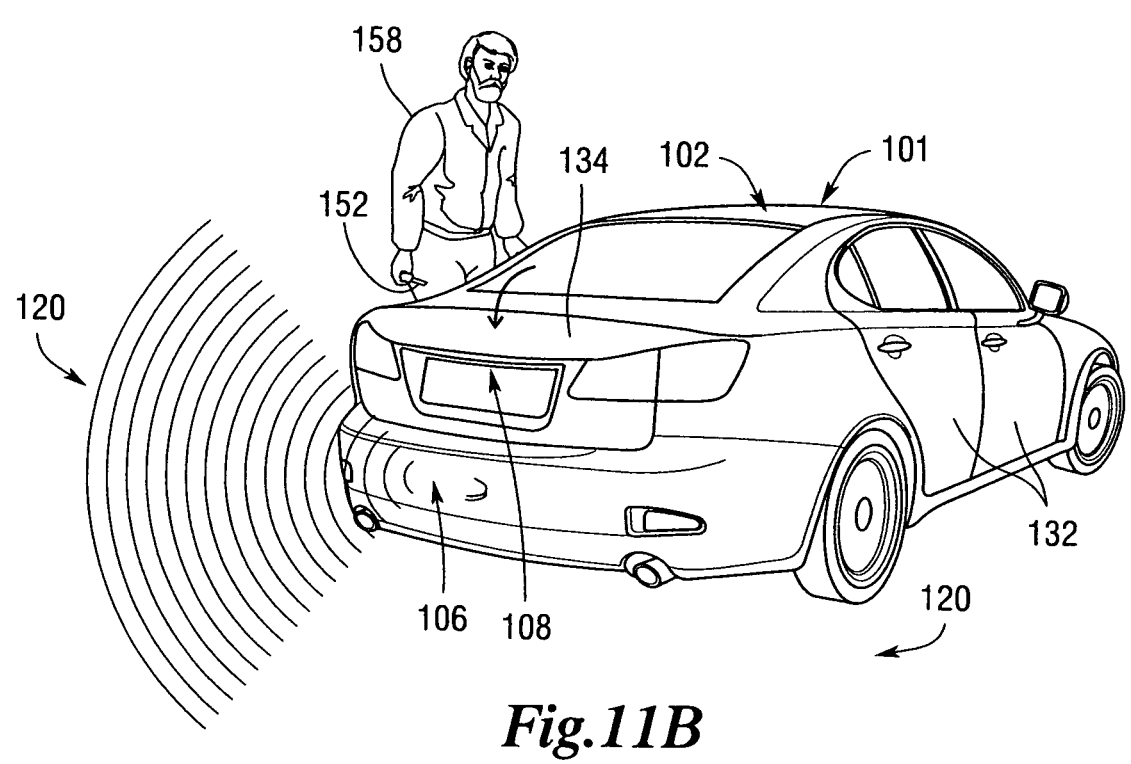

In the embodiment FIGS. 11A and 11B show the control system being applied to a situation where sensors 106 detect a key 152 specific to the vehicle 101 while the vehicle 101 is parked. If the trunk hatch 134 is closed and the key 152 remains in the area 118 behind the vehicle 101 for a predetermined amount of time, the computer 102 issues a control action to an actuator 108 that opens/unlatches the trunk hatch 134 so that the person 158 can conveniently put a carried item into the trunk without having to put the item down, thus freeing the person's hand to use the key 152 to unlatch the trunk hatch 134. As shown in FIG. 11B, the computer 102 is also programmed to close and lock the trunk hatch 134 when the person 158 moves out of the area 118 behind the vehicle 101 as detected by the sensors 106.

Figure 12A:
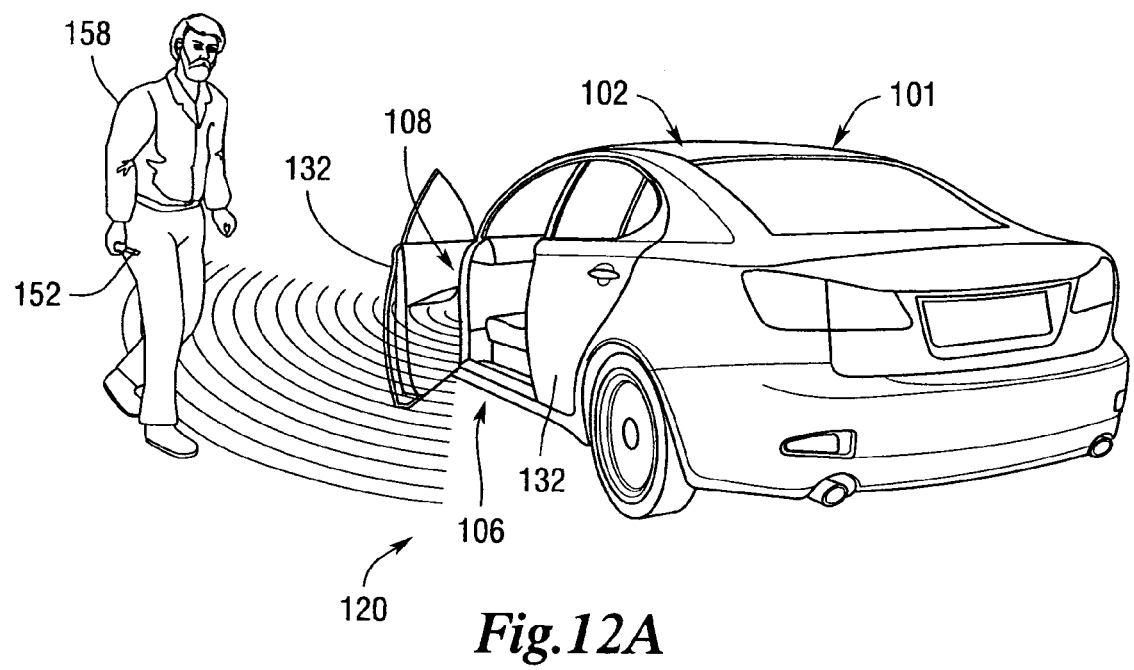
FIGS. 12A-12B are convenience features for a parked vehicle.
Figure 12B:
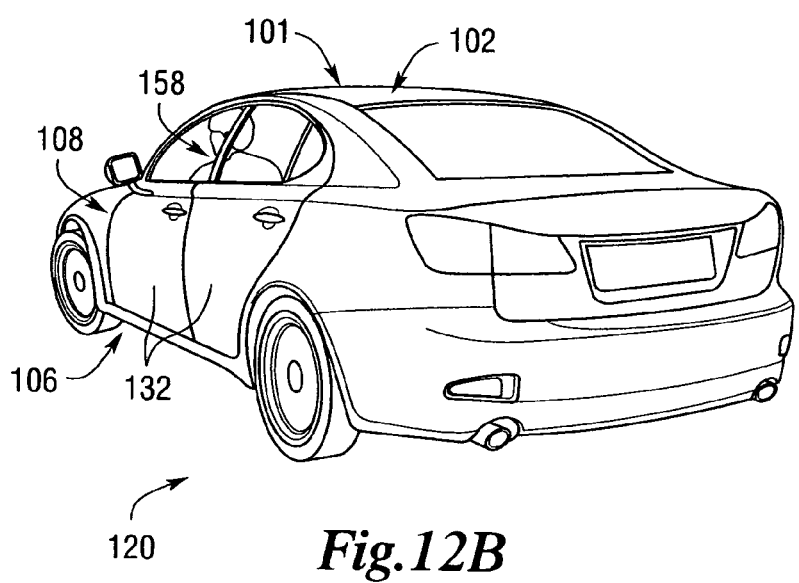

In another embodiment FIGS. 12A and 12B illustrate the control system being applied to a situation where sensors 106 detect a key 152 specific to the vehicle 101 while the vehicle 101 is parked. If a door 132 is closed and the key 152 remains in the area 120 adjacent to the vehicle for a predetermined amount of time, the computer 102 issues a control action to an actuator 108 that unlocks and opens the nearest front door 132 so that the person 158 can conveniently enter even a locked vehicle 101 without having to free the person's hand to use the key 152 for unlocking and/or opening the door 132, see FIG. 12A.

As drawn in FIG. 12B, the computer 102 can be further programmed to activate an actuator 108 to close and/or lock the door 132 after the person 158 enters the vehicle 101 or moves out of the area adjacent the vehicle 101 as detected by the sensors 106.

In yet another embodiment a sensor directly above the operator's 107 head monitors an operator's 107 head and/or eyes. The computer 102 is programmed to interpret the sensor input and look for evidence that the operator 107 is losing alertness, for example by detecting nodding action, eye blinking or closed eyes. The computer then actuates an alarm to awaken and/or alert the operator 107.

In one embodiment the computer 102 can integrate its findings from monitoring the operator 107 with the results from the other sensors 106. For example, the computer 102 can determine if the vehicle 101 is drifting across a center line to further make a determination about whether the operator 107 needs to be warned or alerted and can determine how to alert the operator 107. For example, the alert could come by biasing the feeling in the steering system 124. On the other hand, the alert could be an audible alarm if the computer 102 determines that the operator 107 is falling or has fallen asleep. In this way the holistic cybernetic vehicle control system 100 can meld with the operator's 107 needs deciding how to best inform and aid the operator 107.

This invention has been explained with respect to the details, arrangements of components and certain specific embodiments shown in the accompanying drawings. These embodiments can be modified by those skilled in the art without departing from the spirit and scope of this invention. The appended claims are intended to be interpreted to cover apparatus and methods that do not depart from the spirit and scope of this invention.

What is claimed is:

1. A method for controlling a vehicle using holistic cybernetic vehicle control to prevent collisions, the vehicle having a human operator and a vehicle control system comprising manual controls, a computer, sensors, control actuators, and other information delivery apparatus, the method comprising:
   using at least one of the sensors to monitor the vehicle's external environment and provide input to the computer;
   using at least one of the sensors to monitor the operator and provide input to the computer;
   using the computer to identify a potential threat based on data from at least one of the sensors;
   using the computer to determine action to be taken by at least one of the control actuators;
   using the computer to control the at least one control actuator to provide suggested vehicle control actions through the manual controls;
   delivering the suggested actions to the human operator through the actuated manual controls and other information delivery apparatus of the vehicle;
   modifying the actuated vehicle control actions and other information delivery apparatus in response to additional input from the at least one sensor to provide further suggested actions to the operator;
   allowing the operator to override the suggested actions of the holistic cybernetic vehicle control when the operator deems such action necessary; and
   actions of said holistic cybernetic vehicle control including:
      bias against movement of said manual controls;
      movement of said manual controls;
      modification of controls to affect vehicle movement;
      flashing vehicle lights to communicate with operators of other vehicles;
      vehicle speed adjustment based on movement and distance to other vehicles;
      vehicle speed adjustment based on the position of non-moving objects;
      vehicle speed adjustment based on sensed road conditions; and
      vehicle separation adjustment based on vehicle speed and the speed of other vehicles.

2. The method of claim 1, wherein the step of actuating holistic cybernetic vehicle control actions further comprises at least one of the following:
   biasing a brake pedal in proportion to the braking force applied by the vehicle control system to the brakes;
   biasing an acceleration pedal in proportion to engine acceleration applied by the vehicle control system;
   biasing a steering wheel in the direction of and in proportion to the steering force applied by the vehicle control system;
   moving a horn button in accordance with horn blowing applied by the vehicle control system; and
   moving a light switch in accordance with light flashing applied by the vehicle control system.

3. The method of claim 1, wherein the step of modifying the suggested control actions in response to input from the sensors comprises repeatedly modifying the control actions until modification is no longer needed.

4. The method of claim 1, wherein the step of modifying the control actions in response to sensor input comprises responding to the operator's reaction to the control actions.

5. The method of claim 4, wherein responding to the operator's reaction to the control actions comprises resisting a control action taken by the operator.

6. The method of claim 1, wherein the step of actuating vehicle control actions comprises providing feedback to the operator to help prevent collision and informing the operator about the nature of the potential collision threat.

7. The method of claim 6, further comprising the steps of:
   monitoring a closing velocity relative to an object near the vehicle when the object is in an adjacent lane; and
   applying resistance to a steering wheel of the vehicle such that the operator will be prompted not to steer the vehicle into the adjacent lane when the closing velocity exceeds a threshold velocity.

8. The method of claim 1, further comprising the steps of:
   monitoring a closing velocity relative to an object in front of the vehicle, and
   decreasing the velocity of the vehicle by a calculated amount when the closing velocity exceeds a predetermined threshold velocity.

9. The method of claim 1, further comprising the steps of:
   monitoring a closing velocity relative to an object behind the vehicle; and
   flashing at least one rear light of the vehicle when the closing velocity exceeds a predetermined threshold velocity.

10. The method of claim 1, further comprising the steps of:
   monitoring objects at an intersection being approached by the vehicle;

determining whether the safest course of action is to brake or accelerate when any of the objects is a potential collision threat;

increasing the speed of the vehicle by a calculated amount when the safest course of action is to accelerate; and decreasing the speed of the vehicle by a calculated amount when the safest course of action is to brake.

11. The method of claim 1, further comprising the steps of:

monitoring a closing velocity relative to objects directly behind the vehicle when backing up; and stopping the vehicle before impact occurs when the closing velocity is determined by the computer to be unsafe.

12. The method of claim 1, further comprising the steps of:

monitoring an object in an adjacent lane wherein the object is approaching the vehicle while crossing the center line of a roadway, and initiating control actions to prevent a collision when the vehicle control system identifies the object as a collision threat.

13. The method of claim 1 wherein the step of monitoring the vehicle's external environment includes monitoring weather conditions surrounding the vehicle.

14. The method of claim 1, wherein the step of monitoring the vehicle's external environment comprises monitoring road conditions.

15. The method of claim 1, wherein the vehicle control system comprises an attachable vehicle roof cap housing physical components of the vehicle control system.

16. The method of claim 1, wherein the step of modifying the control actions in response to feedback comprises modifying the control actions in response to communication with another vehicle.

* * * * *